US007809453B2

(12) United States Patent
Reichelt et al.

(10) Patent No.: US 7,809,453 B2
(45) Date of Patent: Oct. 5, 2010

(54) APPARATUS AND METHOD FOR SIMULATING A WAVE FIELD SYNTHESIS SYSTEM

(75) Inventors: Katrin Reichelt, Dresden (DE); Gabriel Gatzsche, Martinroeda (DE); Frank Melchior, Ilmenau (DE); Sandra Brix, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 471 days.

(21) Appl. No.: 11/837,105

(22) Filed: Aug. 10, 2007

(65) Prior Publication Data

US 2008/0013746 A1 Jan. 17, 2008

Related U.S. Application Data

(63) Continuation of application No. PCT/EP2006/001413, filed on Feb. 16, 2006.

(30) Foreign Application Priority Data

Feb. 23, 2005 (DE) ....................... 10 2005 008 369

(51) Int. Cl.
*G06F 17/00* (2006.01)
*H04R 29/00* (2006.01)
*H04R 25/00* (2006.01)

(52) U.S. Cl. ............................ 700/94; 381/58; 381/182

(58) Field of Classification Search ................... 700/94; 715/727; 381/58, 182

See application file for complete search history.

(56) References Cited

U.S. PATENT DOCUMENTS 5,390,138 A * 2/1995 Milne et al. ................. 715/727

(Continued)

FOREIGN PATENT DOCUMENTS

DE 10254404 A1 6/2004

(Continued)

OTHER PUBLICATIONS

Scheirer, et al. "AudioBIFS: Describing Audio Scenes with the MPEG-4 Multimedia Standard", Sep. 1999, IEEE, IEEE Transactions on Multimedia vol. 1, No. 3, all pp. (237-250).*

(Continued)

*Primary Examiner*—Curtis Kuntz
*Assistant Examiner*—Jesse A Elbin
(74) *Attorney, Agent, or Firm*—Keating & Bennett, LLP

(57) ABSTRACT

For simulating a wave field synthesis system, an audio scene description defining a temporal sequence of audio objects is provided, an audio object having an audio file for a virtual source or a reference to the audio file and information on a source position of the virtual source. Furthermore, an output condition the wave field synthesis system is to satisfy is given. Furthermore, a simulator for simulating the behavior of the wave field synthesis system for the audio scene description, using the audio data and the source positions as well as information on the wave field synthesis system, is provided. Finally a checker performs a check to determine if the simulated behavior of the wave field synthesis system satisfies the output condition. This achieves more flexible audio scene description creation as well as flexible portability of an audio scene description developed for one system to another wave field synthesis system.

16 Claims, 7 Drawing Sheets

U.S. PATENT DOCUMENTS

| | | | |
|---|---|---|---|
| 6,572,475 | B1 | 6/2003 | Okabe et al. |
| 7,027,600 | B1 | 4/2006 | Kaji et al. |
| 2001/0012368 | A1 | 8/2001 | Yamazaki |
| 2005/0175197 | A1 | 8/2005 | Melchior et al. |
| 2006/0092854 | A1 | 5/2006 | Roder et al. |
| 2006/0098830 | A1 | 5/2006 | Roeder et al. |
| 2006/0109992 | A1 | 5/2006 | Roeder et al. |

FOREIGN PATENT DOCUMENTS

| | | | |
|---|---|---|---|
| JP | 07-303148 | A | 11/1995 |
| JP | 10-211358 | A | 8/1998 |
| JP | 11-027800 | A | 1/1999 |
| JP | 2000-267675 | A | 9/2000 |
| JP | 2002-199500 | A | 7/2002 |
| JP | 2003-284196 | A | 10/2003 |
| JP | 2004-007211 | A | 1/2004 |
| JP | 2004-258765 | A | 9/2004 |
| WO | 2004/036955 | A1 | 4/2004 |
| WO | 2004/051624 | A2 | 6/2004 |
| WO | 2004/103022 | A2 | 11/2004 |
| WO | 2004/103024 | A1 | 11/2004 |
| WO | 2004/114725 | A1 | 12/2004 |

OTHER PUBLICATIONS

Official communication issued in countrpart German Application No. 10 2005 008 369.2, mailed on Oct. 31, 2007.

Theile et al.: "Neue Moglichkeiten Der Raumlichen Tonaufnahme Und -Wiedergabe," Fernseh- und Kinotechnik Teil 1 pp. 735-739, [http://web.archive.org/web/20050208002538/http://www.irt.de.wittek/hauptmikrofon/FKT_Theile_Wittek_Reisinger-1.pdf] Apr. 2003.

Bangert: "Die Auswirkungen Der Wellenfeldsynthese Auf Den Kinoton," SAE Institute, Feb. 13, 2004, [http://bangscape.de/trash/DA_Bangert_WFS.pdf].

Wittek: "Perception of Spatially Synthesized Sound Fields," Dec. 2003; [http://web.archive.org/web/20040626142234/http://www/irt.de/wittek.hauptmikrofon.Wittek_WFS_LitReview.pdf].

Fraunhofer-Institut Fur Digitale Medientechnologie IDMT: "IOSONO Spatial Audio Workstation," Nov. 2003; [http://web.archive.org/web.20040302011155/www.emt.lis.fraunhofer.de/presse/textarchiv/produktinformation/IOSONO_Authori_dt.pdf].

Official communication issued in counterpart International Application No. PCT/EP2006/001413, mailed on Sep. 20, 2007.

Official communication issued in the counterpart International Application No. PCT/EP2006/001413, mailed on Jun. 7, 2006.

Katrin Reichelt et al., "Apparatus and Method for Controlling a Wave Field Synthesis Renderer Means With Audio Objects," U.S. Appl. No. 11/837,099, filed on Aug. 10, 2007.

Katrin Reichelt et al., "Apparatus and Method for Controlling a Wave Field Synthesis Rendering Means," U.S. Appl. No. 11/840,327, filed on Aug. 17, 2007.

Katrin Reichelt et al., "Apparatus and Method for Storing Audio Files," U.S. Appl. No. 11/837,109, filed on Aug. 10, 2007.

Katrin Reichelt et al., "Apparatus and Method for Providing Data in a Multi-Renderer System," U.S. Appl. No. 11/840,333, filed on Aug. 17, 2007.

Berkhout, A.J. et al.: "Acoustic Control by Wave Field Synthesis," Journal of the Acoustical Society of America, AIP/Acoustical Society of America, No. 5, pp. 2764-2778, NY, US, May 1993.

Heimrich, T.: "Modeling of Output Contraints in Multimedia Database Systems," First International Multimedia Modelling Conference, IEEE, Jan. 2, 2005-Jan. 14, 2005.

Melchior., F. et al.: "Authoring System for Wave Field Synthesis," AES Convention Paper, 115th Convention, AES Meeting, Oct. 10, 2003, pp. 1-10.

Berkhout, A J: "A Holographic Approach to Acoustic Control" Journal of the Audio Engineering Society, Audio Engineering Society, vol. 36, No. 12, pp. 977-995, Dec. 1988.

Escolano, J. et al.: "Wave Field Synthesis Simulation by Means of Finite-Difference Time Domain Technique" Proceedings of 12th European Signal Processing Conference (Eusipco 2004); pp. 1777-1780.

Bleda, S. et al.: "Software for the Simulation, Performance Analisys and Real-Time Implementation of Wave Field Synthesis for 3D-Audio" Proceedings of the 6th International Conference on Digital Audio Effects, Sep. 8, 2003; pp. 1-6.

Horbach, U. et al.; "Numerical Simulation of Wave Fields Created by Loudspeaker Arrays" AES 107th Convention, Sep. 24, 1999, New York; pp. 1-16.

Sontacchi, A. et al.: "Comparison of Panning Algorithms for Auditory Interfaces Employed for Desktop Applications" Seventh International Symposium, Jul. 1, 2003; pp. 149-152.

Boone, M. et al.: "Spatial Sound-Field Reproduction by Wave-Field Synthesis" Journal of the Audio Engineering Society, Audio Engineering Society, vol. 43, No. 12, Dec. 1995; pp. 1003-1012.

Office Action issued in U.S. Appl. No. 11/837,099, mailed on Oct. 22, 2009.

Seo et al., "Implementation of Interactive 3D Audio Using MPEG-4 Multimedia Standards," Oct. 2003, Audio Engineering Society, Convention Paper 5980, pp. 1-6.

Official Communication issued in corresponding Japanese Patent Application No. 2007-556536, mailed on Jun. 29, 2010.

* cited by examiner

OUTPUT CONDITION:

FOR EACH POINT IN THE REPRODUCTION ROOM (RPR):

$$t_{WF1} - t_{WF2} \leq \Delta t_{max}$$

- SMALL $\Delta t_{max}$ FOR PROBLEMATIC SOURCES, SUCH AS LEAD GUITAR AND BASS GUITAR

- LARGE OR NO $\Delta t_{max}$ FOR UNPROBLEMATIC SOURCES, SUCH AS APPLAUSE, (WIND) NOISE, ...

AUDIO OBJECT:
- AUDIO FILE
- IDENTIFICATION OF THE VIRTUAL SOURCE
- TIME SPAN FOR BEGINNING/END
- LOCATION SPAN FOR POSITION
- ...

APPARATUS AND METHOD FOR SIMULATING A WAVE FIELD SYNTHESIS SYSTEM

CROSS-REFERENCE TO RELATED APPLICATIONS

This application is a continuation of copending International Application No. PCT/EP2006/001413, filed Feb. 16, 2006, which designated the United States and was not published in English.

BACKGROUND OF THE INVENTION

1. Field of the Invention

The present invention relates to the wave field synthesis technique, and particularly to tools for creating audio scene descriptions and/or for verifying audio scene descriptions.

2. Description of the Related Art

There is an increasing need for new technologies and innovative products in the area of entertainment electronics. It is an important prerequisite for the success of new multimedia systems to offer optimal functionalities or capabilities. This is achieved by the employment of digital technologies and, in particular, computer technology. Examples for this are the applications offering an enhanced close-to-reality audiovisual impression. In previous audio systems, a substantial disadvantage lies in the quality of the spatial sound reproduction of natural, but also of virtual environments.

Methods of multi-channel loudspeaker reproduction of audio signals have been known and standardized for many years. All usual techniques have the disadvantage that both the site of the loudspeakers and the position of the listener are already impressed on the transmission format. With wrong arrangement of the loudspeakers with reference to the listener, the audio quality suffers significantly. Optimal sound is only possible in a small area of the reproduction space, the so-called sweet spot.

A better natural spatial impression as well as greater enclosure or envelope in the audio reproduction may be achieved with the aid of a new technology. The principles of this technology, the so-called wave field synthesis (WFS), have been studied at the TU Delft and first presented in the late 80s (Berkout, A. J.; de Vries, D.; Vogel, P.: Acoustic control by Wave field Synthesis. JASA 93, 1993).

Due to this method's enormous demands on computer power and transfer rates, the wave field synthesis has up to now only rarely been employed in practice. Only the progress in the area of the microprocessor technology and the audio encoding do permit the employment of this technology in concrete applications today. First products in the professional area are expected next year. In a few years, first wave field synthesis applications for the consumer area are also supposed to come on the market.

The basic idea of WFS is based on the application of Huygens' principle of the wave theory:

Each point caught by a wave is starting point of an elementary wave propagating in spherical or circular manner.

Applied on acoustics, every arbitrary shape of an incoming wave front may be replicated by a large amount of loudspeakers arranged next to each other (a so-called loudspeaker array). In the simplest case, a single point source to be reproduced and a linear arrangement of the loudspeakers, the audio signals of each loudspeaker have to be fed with a time delay and amplitude scaling so that the radiating sound fields of the individual loudspeakers overlay correctly. With several sound sources, for each source the contribution to each loudspeaker is calculated separately and the resulting signals are added. If the sources to be reproduced are in a room with reflecting walls, reflections also have to be reproduced via the loudspeaker array as additional sources. Thus, the expenditure in the calculation strongly depends on the number of sound sources, the reflection properties of the recording room, and the number of loudspeakers.

In particular, the advantage of this technique is that a natural spatial sound impression across a great area of the reproduction space is possible. In contrast to the known techniques, direction and distance of sound sources are reproduced in a very exact manner. To a limited degree, virtual sound sources may even be positioned between the real loudspeaker array and the listener.

Although the wave field synthesis functions well for environments the properties of which are known, irregularities occur if the property changes or the wave field synthesis is executed on the basis of an environment property not matching the actual property of the environment.

A property of the surrounding may also be described by the impulse response of the surrounding.

This will be set forth in greater detail on the basis of the subsequent example. It is assumed that a loudspeaker sends out a sound signal against a wall, the reflection of which is undesired. For this simple example, the space compensation using the wave field synthesis would consist in the fact that at first the reflection of this wall is determined in order to ascertain when a sound signal having been reflected from the wall again arrives the loudspeaker, and which amplitude this reflected sound signal has. If the reflection from this wall is undesirable, there is the possibility, with the wave field synthesis, to eliminate the reflection from this wall by impressing a signal with corresponding amplitude and of opposite phase to the reflection signal on the loudspeaker, so that the propagating compensation wave cancels out the reflection wave, such that the reflection from this wall is eliminated in the surrounding considered. This may be done by at first calculating the impulse response of the surrounding and then determining the property and position of the wall on the basis of the impulse response of this surrounding, wherein the wall is interpreted as a mirror source, i.e. as a sound source reflecting incident sound.

If at first the impulse response of this surrounding is measured and then the compensation signal, which has to be impressed on the loudspeaker in a manner superimposed on the audio signal, is calculated, cancellation of the reflection from this wall will take place, such that a listener in this surrounding has the sound impression that this wall does not exist at all.

However, it is crucial for optimum compensation of the reflected wave that the impulse response of the room is determined accurately so that no over- or undercompensation occurs.

Thus, the wave field synthesis allows for correct mapping of virtual sound sources across a large reproduction area. At the same time it offers, to the sound master and sound engineer, new technical and creative potential in the creation of even complex sound landscapes. The wave field synthesis (WFS, or also sound field synthesis), as developed at the TU Delft at the end of the 80s, represents a holographic approach of the sound reproduction. The Kirchhoff-Helmholtz integral serves as a basis for this. It states that arbitrary sound fields within a closed volume can be generated by means of a distribution of monopole and dipole sound sources (loudspeaker arrays) on the surface of this volume.

In the wave field synthesis, a synthesis signal for each loudspeaker of the loudspeaker array is calculated from an audio signal sending out a virtual source at a virtual position, wherein the synthesis signals are formed with respect to amplitude and phase such that a wave resulting from the superposition of the individual sound wave output by the loudspeakers present in the loudspeaker array corresponds to the wave that would be due to the virtual source at the virtual position if this virtual source at the virtual position were a real source with a real position.

Typically, several virtual sources are present at various virtual positions. The calculation of the synthesis signals is performed for each virtual source at each virtual position, so that typically one virtual source results in synthesis signals for several loudspeakers. As viewed from a loudspeaker, this loudspeaker thus receives several synthesis signals, which go back to various virtual sources. A superposition of these sources, which is possible due to the linear superposition principle, then results in the reproduction signal actually sent out from the loudspeaker.

The possibilities of the wave field synthesis can be utilized the better, the larger the loudspeaker arrays are, i.e. the more individual loudspeakers are provided. With this, however, the computation power the wave field synthesis unit must summon also increases, since channel information typically also has to be taken into account. In detail, this means that, in principle, a transmission channel of its own is present from each virtual source to each loudspeaker, and that, in principle, it may be the case that each virtual source leads to a synthesis signal for each loudspeaker, and/or that each loudspeaker obtains a number of synthesis signals equal to the number of virtual sources.

If the possibilities of the wave field synthesis particularly in movie theater applications are to be utilized in that the virtual sources can also be movable, it can be seen that rather significant computation powers are to be handled due to the calculation of the synthesis signals, the calculation of the channel information and the generation of the reproduction signals through combination of the channel information and the synthesis signals.

Furthermore, it is to be noted at this point that the quality of the audio reproduction increases with the number of loudspeakers made available. This means that the audio reproduction quality becomes the better and more realistic, the more loudspeakers are present in the loudspeaker array(s).

In the above scenario, the completely rendered and analog-digital-converted reproduction signal for the individual loudspeakers could, for example, be transmitted from the wave field synthesis central unit to the individual loudspeakers via two-wire lines. This would indeed have the advantage that it is almost ensured that all loudspeakers work synchronously, so that no further measures would be needed for synchronization purposes here. On the other hand, the wave field synthesis central unit could be produced only for a particular reproduction room or for reproduction with a fixed number of loudspeakers. This means that, for each reproduction room, a wave field synthesis central unit of its own would have to be fabricated, which has to perform a significant measure of computation power, since the computation of the audio reproduction signals must take place at least partially in parallel and in real time, particularly with respect to many loudspeakers and/or many virtual sources.

German patent DE 10254404 B4 discloses a system as illustrated in FIG. 7. One part is the central wave field synthesis module 10. The other part consists of individual loudspeaker modules 12*a*, 12*b*, 12*c*, 12*d*, 12*e*, which are connected to actual physical loudspeakers 14*a*, 14*b*, 14*c*, 14*d*, 14*e*, such as it is shown in FIGS. 1A-1D. It is to be noted that the number of the loudspeakers 14*a*-14*e* lies in the range above 50 and typically even significantly above 100 in typical applications. If a loudspeaker of its own is associated with each loudspeaker, the corresponding number of loudspeaker modules also is needed. Depending on the application, however, it is advantageous to address a small group of adjoining loudspeakers from a loudspeaker module. In this connection, it is arbitrary whether a loudspeaker module connected to four loudspeakers, for example, feeds the four loudspeakers with the same reproduction signal, or corresponding different synthesis signals are calculated for the four loudspeakers, so that such a loudspeaker module actually consists of several individual loudspeaker modules, which are, however, summarized physically in one unit.

Between the wave field synthesis module 10 and every individual loudspeaker 12*a*-12*e*, there is a transmission path 16*a*-16*e* of its own, with each transmission path being coupled to the central wave field synthesis module and a loudspeaker module of its own.

A serial transmission format providing a high data rate, such as a so-called Firewire transmission format or a USB data format, is advantageous as data transmission mode for transmitting data from the wave field synthesis module to a loudspeaker module. Data transfer rates of more than 100 megabits per second are advantageous.

The data stream transmitted from the wave field synthesis module 10 to a loudspeaker module thus is formatted correspondingly according to the data format chosen in the wave field synthesis module and provided with synchronization information provided in usual serial data formats. This synchronization information is extracted from the data stream by the individual loudspeaker modules and used to synchronize the individual loudspeaker modules with respect to their reproduction, i.e. ultimately to the analog-digital conversion for obtaining the analog loudspeaker signal and the sampling (re-sampling) provided for this purpose. The central wave field synthesis module works as a master, and all loudspeaker modules work as clients, wherein the individual data streams all obtain the same synchronization information from the central module 10 via the various transmission paths 16*a*-16*e*. This ensures that all loudspeaker modules work synchronously, namely synchronized with the master 10, which is important for the audio reproduction system so as not to suffer loss of audio quality, so that the synthesis signals calculated by the wave field synthesis module are not irradiated in temporally offset manner from the individual loudspeakers after corresponding audio rendering.

The concept described indeed provides significant flexibility with respect to a wave field synthesis system, which is scalable for various ways of application. But it still suffers from the problem that the central wave field synthesis module, which performs the actual main rendering, i.e. which calculates the individual synthesis signals for the loudspeakers depending on the positions of the virtual sources and depending on the loudspeaker positions, represents a “bottleneck” for the entire system. Although, in this system, the “post-rendering”, i.e. the imposition of the synthesis signals with channel transmission functions, etc., is already performed in decentralized manner, and hence the necessary data transmission capacity between the central renderer module and the individual loudspeaker modules has already been reduced by selection of synthesis signals with less energy than a determined threshold energy, all virtual sources, however, still have to be rendered for all loudspeaker modules in a way, i.e. converted into synthesis signals, wherein the selection takes place only after rendering.

This means that the rendering still determines the overall capacity of the system. If the central rendering unit thus is capable of rendering 32 virtual sources at the same time, for example, i.e. to calculate the synthesis signals for these 32 virtual sources at the same time, serious capacity bottlenecks occur, if more than 32 sources are active at one time in one audio scene. For simple scenes this is sufficient. For more complex scenes, particularly with immersive sound impressions, i.e. for example when it is raining and many rain drops represent individual sources, it is immediately apparent that the capacity with a maximum of 32 sources will no longer suffice. A corresponding situation also exists if there is a large orchestra and it is desired to actually process every orchestral player or at least each instrument group as a source of its own at its own position. Here, 32 virtual sources may very quickly become too less.

Typically, in a known wave field synthesis concept, one uses a scene description in which the individual audio objects are defined together such that, using the data in the scene description and the audio data for the individual virtual sources, the complete scene can be rendered by a renderer or a multi-rendering arrangement. Here, it is exactly defined for each audio object, where the audio object has to begin and where the audio object has to end. Furthermore, for each audio object, the position of the virtual source at which that virtual source is to be, i.e. which is to entered into the wave field synthesis rendering means, is indicated exactly, so that the corresponding synthesis signals are generated for each loudspeaker. This results in the fact that, by superposition of the sound waves output from the individual loudspeakers as a reaction to the synthesis signals, an impression develops for a listener as if a sound source were positioned at a position in the reproduction room or outside the reproduction room, which is defined by the source position of the virtual source.

It is disadvantageous in the concept described that it is relatively rigid particularly in the creation of the audio scene descriptions. Thus, a sound master will create an audio scene exactly for a certain wave field synthesis equipment, from which he or she exactly knows the situation in the reproduction room and creates the audio scene description so that it smoothly runs on the defined wave field synthesis system known to the producer.

In this connection, the sound master will already take maximum capacities of the wave field synthesis rendering means as well as requirements for the wave field in the reproduction room into account in the creation of the audio scene description. For example, if a renderer has a maximum capacity of 32 audio sources to be processed, the sound master will already take care to edit the audio scene description so that there are never more than 32 sources to be processed at the same time.

Moreover, the sound master will already think of the fact that, in the positioning of e.g. two instruments such as bass guitar and lead guitar, for the entire reproduction room, the expansions of which are known to the producer, sound run times are to be met. Thus, for a clear and non-blurred sound image, it is important that e.g. bass guitar and lead guitar be perceived in relatively uniform manner by the listener. A sound master will then take care, in the virtual positioning, i.e. in the association of the virtual positions with these two sources, that the wave fronts from these two instruments arrive at a listener at almost the same time in the entire reproduction room.

An audio scene description thus will contain a series of audio objects, with each audio object including a virtual position and a start time instant, an end time instant or a duration.

Normally, by manual checks, i.e. by test listening at various positions in the reproduction room, it is actually checked if the audio scene description may stay like that, i.e. if the producer of the audio scene description has actually done a good job and has met all requirements of the wave field synthesis system.

It is disadvantageous in this concept that the sound master creating the audio scene description has to concentrate on boundary conditions of the wave field synthesis system, which actually do not concern the creative side of the audio scene. Thus, it would be desirable if the sound master could concentrate on the creative aspects alone, without having to take a certain wave field synthesis system on which an audio scene has to run into account.

It is further disadvantageous in the described concept that, when an audio scene description from a wave field synthesis system with a certain first behavior, for which the audio scene description has been designed, is supposed to run on another wave field synthesis system with a second behavior, for which the audio scene has not been designed.

If one would only have the audio scene description run on the system for which it has not been designed, problems would occur in that audible errors will be introduced if the second system is less powerful than the first system.

If the second system, however, is more powerful than the first system, the audio scene description will, however, only demand the second system within the scope of the performance of the first system and not exhaust the additional performance of the second system.

If the second system further refers to e.g. a larger reproduction room, it can no longer be ensured, at certain places, that the wave fronts of two virtual sources, such as bass guitar and lead guitar, arrive at almost the same time.

Particularly the problem of the concurrent or almost concurrent perception of two virtual sources, which should be synchronous, is very problematic, especially since only manual test listening action and a subjective assessment of the quality at certain places in the reproduction room previously has been possible for this purpose.

In response to such subjective assessments, the sound master then was needed to completely revise the audio scene description actually already finished for the second system, which in turn necessitates both temporal resources and financial resources.

Particularly due to the expectation of a strong expansion of wave field synthesis systems in the next time, the question of the flexible audio scene descriptions that can universally be played on arbitrary systems will come up more and more, in order to achieve similar portability or compatibility at this place some time, as it is known for CDs or DVDs.

SUMMARY OF THE INVENTION

According to an embodiment, an apparatus for simulating a wave field synthesis system with respect to the reproduction room, in which one or more loudspeaker arrays, which can be coupled to a wave field synthesis renderer, are attachable, may have: a provider for providing an audio scene description defining a temporal sequence of audio objects, wherein an audio object has an audio file for a virtual source or a reference to the audio file and information on a source position of the virtual source, and wherein an output condition is given for the wave field synthesis system; a simulator for simulating the behavior of the wave field synthesis system, using information on the wave field synthesis system and the audio files; and a checker for checking if the simulated behavior satisfies the output condition.

According to another embodiment, a method of simulating a wave field synthesis system with respect to the reproduction room, in which one or more loudspeaker arrays, which can be coupled to a wave field synthesis renderer, are attachable, may have the steps of: providing an audio scene description defining a temporal sequence of audio objects, wherein an audio object has an audio file for a virtual source or a reference to the audio file and information on a source position of the virtual source, and wherein an output condition is given for the wave field synthesis system; simulating the behavior of the wave field synthesis system, using information on the wave field synthesis system and the audio files; and checking if the simulated behavior satisfies the output condition.

According to another embodiment, a computer program may have program code for performing, when the program is executed on a computer, a method of simulating a wave field synthesis system with respect to the reproduction room, in which one or more loudspeaker arrays, which can be coupled to a wave field synthesis renderer, are attachable, wherein the method may have the steps of: providing an audio scene description defining a temporal sequence of audio objects, wherein an audio object has an audio file for a virtual source or a reference to the audio file and information on a source position of the virtual source, and wherein an output condition is given for the wave field synthesis system; simulating the behavior of the wave field synthesis system, using information on the wave field synthesis system and the audio files; and checking if the simulated behavior satisfies the output condition.

The present invention is based on the finding that, apart from an audio scene description defining a temporal sequence of audio objects, also output conditions are provided either within the audio scene description or separately from the audio scene description, so as to then simulate the behavior of the wave field synthesis system on which an audio scene description is to run. On the basis of the simulated behavior of the wave field synthesis system and on the basis of the output conditions, it may then be checked whether the simulated behavior of the wave field synthesis system satisfies the output condition or not.

This concept allows to simulate an audio scene description easily for another wave field synthesis system and to take general system-independent output conditions for the other wave field synthesis system into account, without the sound master or the creator of the audio scene description having to deal with such "secular" things of an actual wave field synthesis system. Dealing with the actual boundary conditions of a wave field synthesis system, for example with reference to the capacity of the renderers or the size or number of the loudspeaker arrays in the reproduction room, is taken off the sound master by the inventive apparatus. He or she may simply write their audio scene description, guided alone by the creative idea, as he or she would like it, by securing the artistic impression by the system-independent output conditions.

Hereupon, it is then checked by the inventive concept if the audio scene description, which is written universally, i.e. not for a special system, is able to run on a special system, if and possibly where problems occur in the reproduction room. According to the invention, it must not be waited for intensive listening tests etc. in this processing, but the editor may simulate the behavior of the wave field synthesis system almost in real time and verify it on the basis of the given output condition.

According to the invention, the output condition may refer to hardware aspects of the wave field synthesis system, such as to a maximum processing capacity of the renderer means, or also to sound-field-specific things in the reproduction room, for example that wave fronts of two virtual sources have to be perceived within a maximum time difference, or that level differences between two virtual sources have to lie in a predetermined corridor at all points or at least at certain points in the reproduction room. With respect to the hardware-specific output conditions, it is advantageous not to insert these into the audio scene description due to the flexibility and compatibility requirements, but externally provide same to the checking means.

With respect to sound-field-related output conditions, i.e. output conditions defining what a sound field has to satisfy in the reproduction room, however, it is advantageous to include same into the audio scene description. With this, a creator of an audio scene description ensures that at least minimum requirements to the sound impression are met, but that still a certain flexibility remains in the wave field synthesis rendering, in order to be able to play an audio scene description not only with optimum quality on a single wave field synthesis system, but on various wave field synthesis systems, by advantageously utilizing the flexibility permitted by the author by intelligent post-processing of the audio scene description, which may, however, be performed automatically.

In other words, the present invention serves as a tool to verify if output conditions of an audio scene description can be satisfied by a wave field synthesis system. Should violations of output conditions occur, the inventive concept will, in the embodiment, inform the user as to which virtual sources are problematic, where violations of the output conditions occur in the reproduction room and at what time. With this, it can be assessed whether an audio scene description runs without problem on any wave field synthesis system or the audio scene description needs to be rewritten due to severe violations of the output conditions, or if violations of the output conditions do indeed occur, but these are not so severe that the audio scene description would actually have to be manipulated.

BRIEF DESCRIPTION OF THE DRAWINGS

Embodiments of the present invention will be detailed subsequently referring to the appended drawings, in which.

DETAILED DESCRIPTION OF PREFERRED EMBODIMENTS

Figure 1A:
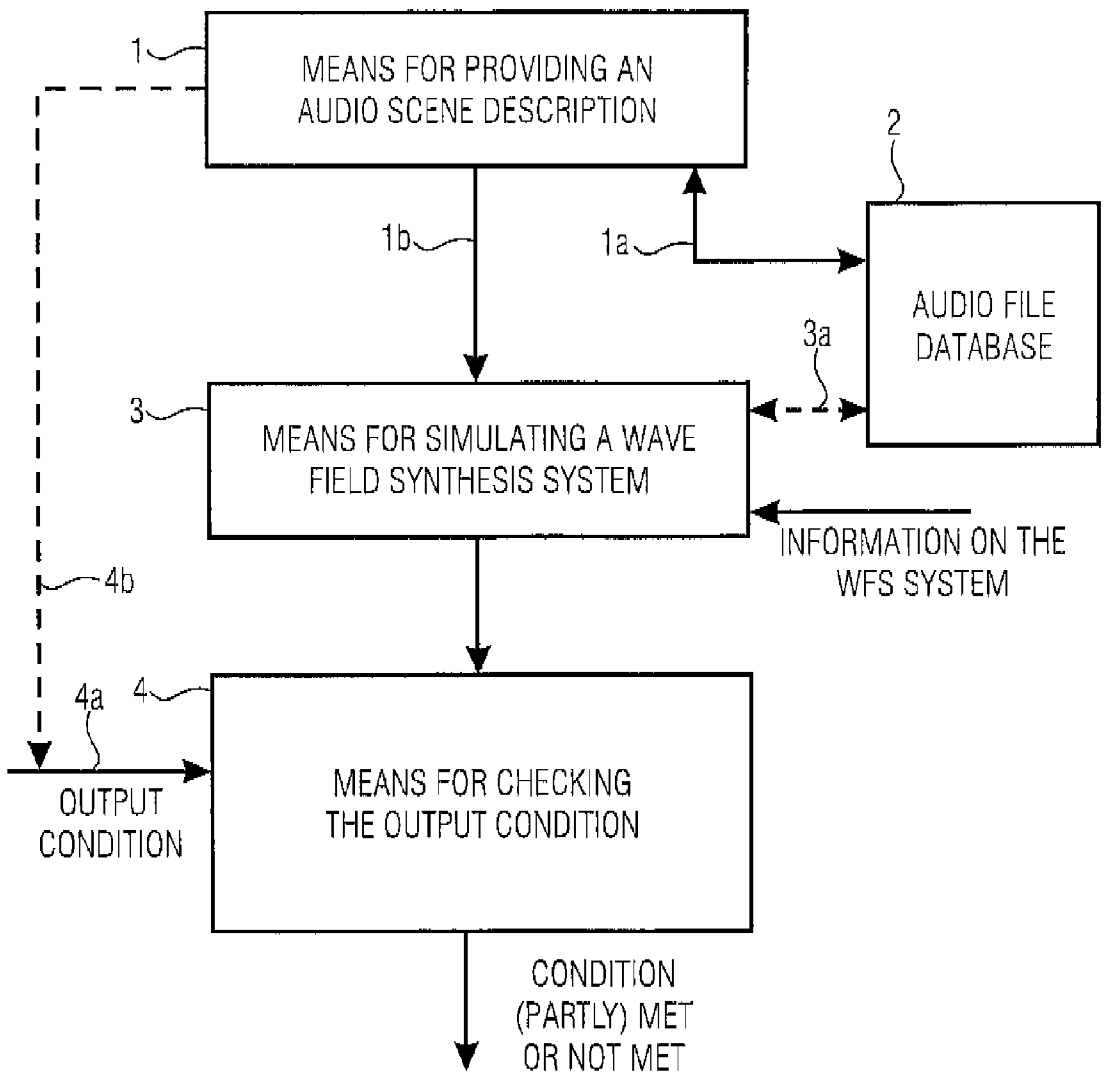
FIG. 1A is a block circuit diagram of an inventive apparatus for simulating a wave field synthesis system.

FIG. 1A shows a schematic illustration of an inventive apparatus for simulating a wave field synthesis system with a reproduction room in which one or more loudspeaker arrays and a wave field synthesis rendering means coupled to the loudspeaker array can be attached. The inventive apparatus includes a means 1 for providing an audio scene description defining a temporal sequence of audio objects, wherein an audio object comprises an audio file for a virtual source or a reference to the audio file and information on a source position of the virtual source. The audio files may either be directly contained in the audio scene description 1 or may be identifiable by references to audio files in an audio file database 2 and be supplied to a means 3 for simulating the behavior of the wave field synthesis system.

Depending on the implementation, the audio files are controlled via a control line 1*a* or supplied to the simulation means 2 via a line 1*b*, in which also the source positions are contained. However, if the files are directly supplied to the means 3 for simulating the behavior of the wave field synthesis system from the audio file database 2, a line 3*a* will be active, which is drawn in dashed manner in FIG. 1A. The means 3 for simulating the wave field synthesis system is formed to use information on the wave field synthesis system, in order to then supply the simulated behavior of the wave field synthesis system on the output side to a means 4 for checking the output condition.

The means 4 is formed to check whether the simulated behavior of the wave field synthesis system satisfies the output condition or not. To this end, the means 4 for checking obtains an output condition via an input line 4*a*, wherein the output condition is either fed to the means 4 externally. Alternatively, the output condition may also originate from the audio scene description, as it is illustrated by a dashed line 4*b*.

The first case, i.e. in which the output condition is supplied externally, is advantageous if the output condition is a hardware-technical condition related to the wave field synthesis system, such as a maximum transmission capacity of a data connection or—as a bottleneck of the entire processing—a maximum computing capacity of a renderer or, in multi-renderer systems, of an individual renderer module.

Renderers generate synthesis signals from the audio files using information on the loudspeakers and using information on the source positions of the virtual sources, i.e. one signal of its own for each of the many loudspeakers, wherein the synthesis signals have different phase and amplitude ratios with respect to each other, so that the many loudspeakers generate a common wave front propagating in the reproduction room, according to the theory of the wave field synthesis. Since the calculation of the synthesis signals is very intensive, typical renderer modules are limited in their capacity, such as to a maximum capacity of 32 virtual sources to be processed at the same time. Such an output condition, namely that a renderer is allowed to process a maximum of 32 sources at one time, could for example be provided to the means 4 for checking the output condition.

Alternative output conditions, which should typically be contained in the audio scene description according to the invention, relate to the sound field in the reproduction room. In particular, output conditions define a sound field or a certain property of a sound field in the reproduction room.

In this case, the means 3 for simulating the wave field synthesis system is formed to simulate the sound field in the reproduction room using information about an arrangement of the one or more loudspeaker array(s) in the reproduction room and using the audio data.

Furthermore, the means 4 for checking in this case is formed to check whether the simulated sound field satisfies the output condition in the reproduction room or not.

Furthermore, in an embodiment of the present invention, the means 4 will be formed to provide an indication, such as an optical indication, through which the user is notified whether the output condition is not satisfied, completely satisfied or only partially satisfied. In the case of the partial satisfaction, the means 4 for checking is further formed to identify, as it is illustrated on the basis of FIG. 1D, e.g. problem zones, in which e.g. a wave front output condition is not satisfied, in the reproduction room (RPR). On the basis of this information, a user of the simulation tool may then decide whether to accept the partial violation or not, or whether to take certain measures to achieve less violation of the output conditions, etc.

Figure 1B:
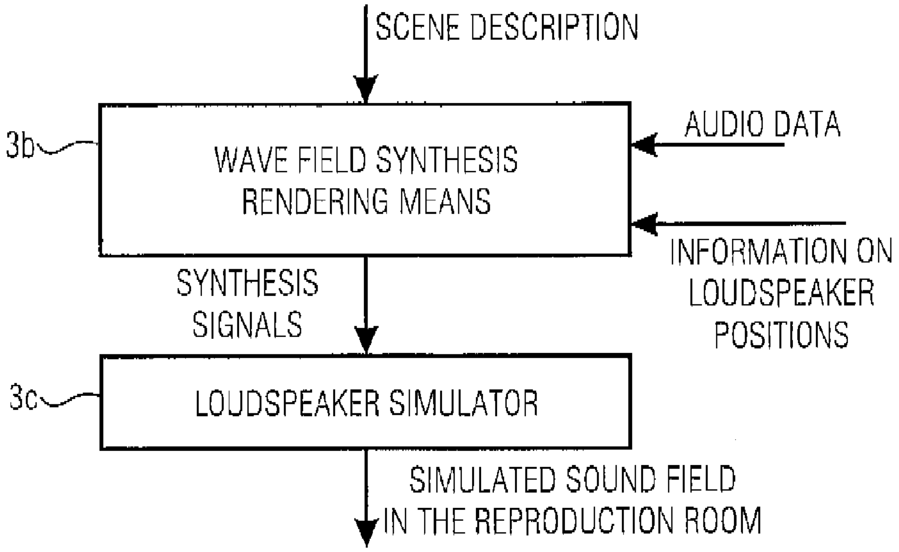
FIG. 1B shows a special implementation of the means for simulating according to FIG. 1*a*.

FIG. 1B shows an implementation of the means 3 for simulating a wave field synthesis system. The means 3 includes, in the embodiment of the present invention shown in FIG. 1B, a wave field synthesis rendering means 3*b*, which is needed for a wave field synthesis system anyway, to generate synthesis signals, which are then supplied to a loudspeaker simulator 3*c*, from the scene description, the audio files, the information about loudspeaker positions and/or further information, if necessary, about e.g. the acoustics of the reproduction room, etc. The loudspeaker simulator is formed to determine a sound field in the reproduction room advantageously at each position of interest of the reproduction room. On the basis of the procedure, which will be described with reference to FIG. 1D in the following, it can be determined, for every sought point in the reproduction room, whether a problem has occurred or not.

Figure 1C:
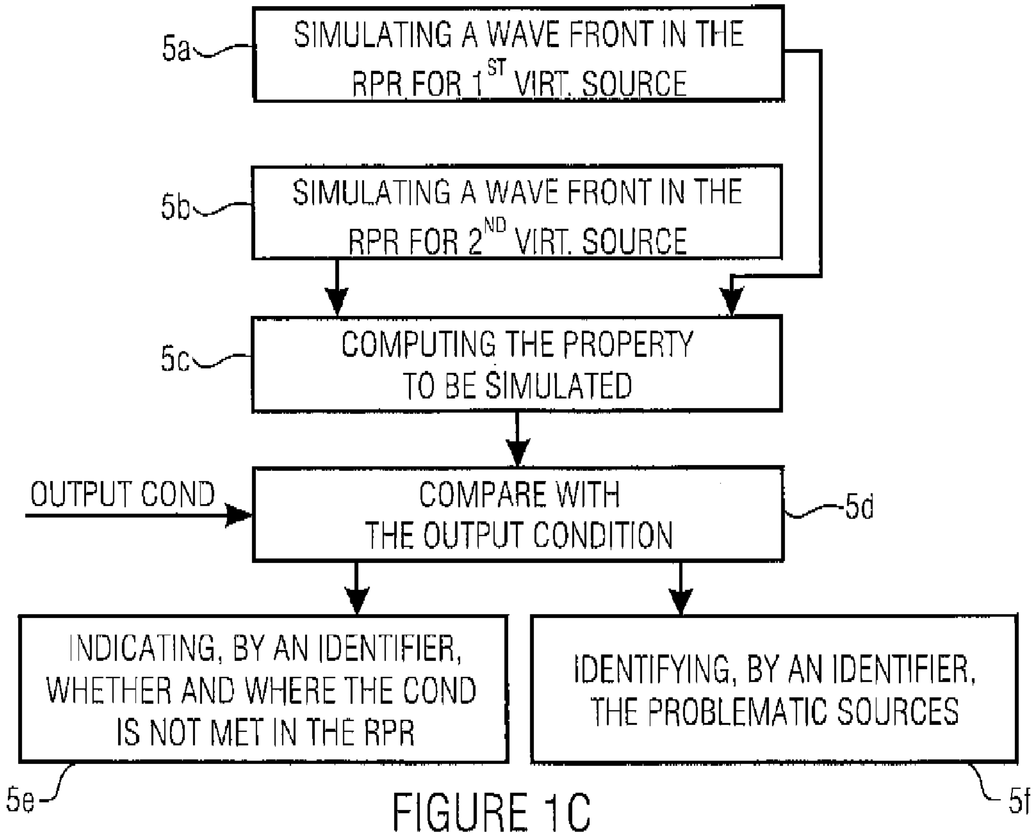
FIG. 1C is a flowchart for illustrating the processes in an output condition defining a property between two virtual sources.

In the flowchart shown in FIG. 1C, a wave front is at first simulated (5*a*) in the reproduction room for a first virtual source by the means 3 for simulating. Then, a wave front is simulated (5*b*) in the reproduction room for the second virtual source by the means 3. Of course, the two steps 5*a* and 5*b* may also be executed in parallel, i.e. at the same time, in the presence of corresponding computing capacities. Hereupon, in a step 5*c*, a property to be simulated is calculated on the basis of the first wave front for the first virtual source and on the basis of the second wave front for the second virtual source. Advantageously, this property will be a property that must be satisfied between two certain virtual sources, such as a level difference, a runtime difference, etc. It depends on the output condition which property is calculated in the step 5*c*, since of course only information to be compared with output conditions has to be simulated. The actual comparison of the calculated property, i.e. the result of step 5*c*, with the output condition takes place in a step 5*d*.

If the sequence of steps 5*a* to 5*d* is performed for various points, it may not only be indicated by an identifier, in a step 5*e*, if a condition is satisfied, but also where such a condition is not satisfied in the reproduction room. Furthermore, in the embodiment shown in FIG. 1C, the problematic virtual sources may also be identified (5*f*) by an identifier.

Subsequently, with reference to FIG. 1D, an embodiment of the present invention is illustrated. An output condition, which is considered in FIGS. 1A-1D, defines a sound runtime with reference to audio data. Thus, it is advantageous to indicate, in the audio scene description, that the wave front due to a guitar and the wave front due to a bass may arrive only a maximum of a certain time duration Δtmax apart from each other at each point in the reproduction room. Thus, it will not be possible to satisfy this condition for each point in the reproduction room, particularly in the reproduction room shown in FIG. 1D, which is surrounded by four loudspeaker arrays LSA1, LSA2, LSA3, LSA4, when the sources are positioned widely spaced apart from each other according to the audio scene description. Problem zones identified by the inventive concept are drawn in the reproduction room in FIG. 1D.

Figure 1D:
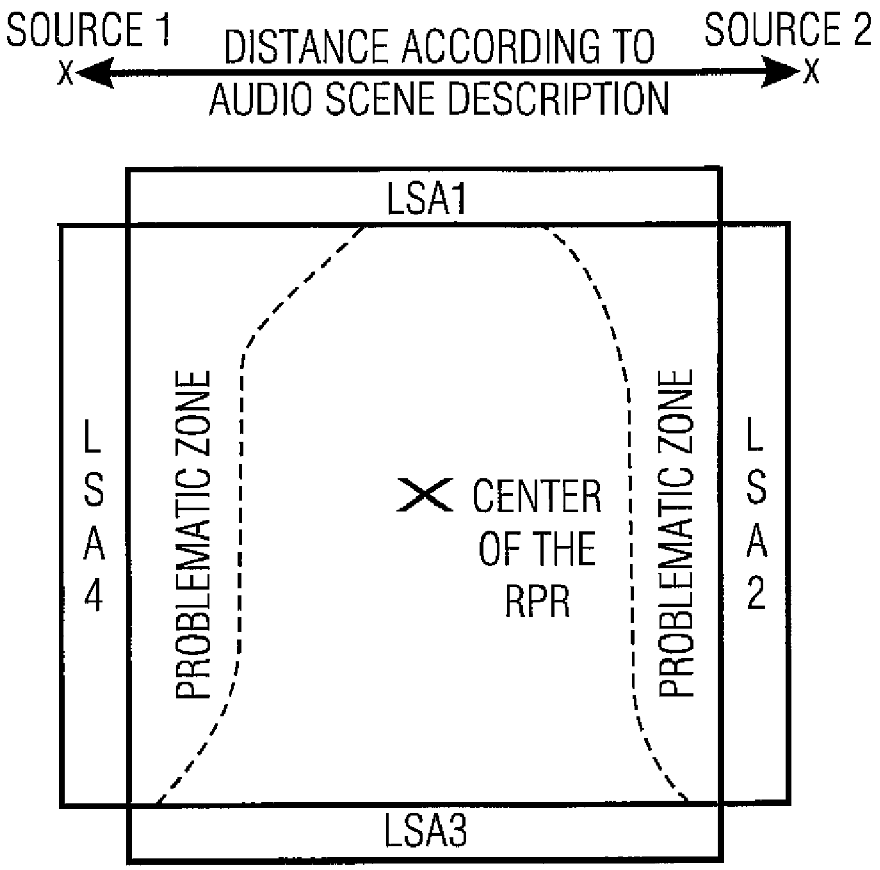
FIG. 1D is a schematic illustration of a reproduction room and of problem zones in an embodiment of the present invention, in which impingement time instants of sound fields are contained in the output condition.

In the embodiment shown in FIG. 1D, the producer for example positioned the guitar and the bass at a distance of 100 m. Furthermore, a maximum runtime difference of 10 m for the entire reproduction room, i.e. a period of 10 m divided by the speed of sound, was given as output condition. The inventive procedure, as it was described on the basis of FIGS. 1A-1D, will discover the problem zones, as they are indicated in FIG. 1D, and notify a producer or a sound master creating the audio scene description with respect to the wave field synthesis system shown in FIG. 1D.

According to the invention, performance bottlenecks and quality holes may hence be predicted. This is achieved by the fact that a central data management is advantageous, i.e. that both the scene description and the audio files are stored in an intelligent database, and that a means 3 for simulating the wave field synthesis system, which provides a more or less exact simulation of the wave field synthesis system, also is provided. With this, intensive manual tests and artificial limitation of the system power to a measure regarded as performance- and quality-safe are eliminated.

In particular, it is advantageous to fix output conditions with respect to temporal reference of various virtual sources. Thus, various audio sources have more or less fixed temporal references. While the delay of the start of a sound of wind by 50 milliseconds does not entail any strongly perceivable quality losses, the drifting apart of the synchronous signals of a guitar and a bass may lead to significant quality losses in the perceived audio signal. The intensity of the perceived quality loss depends on the position of the listener in the reproduction room. According to the invention, such problem zones in the reproduction room are automatically determined, visualized or disabled.

Figures 2, 3:
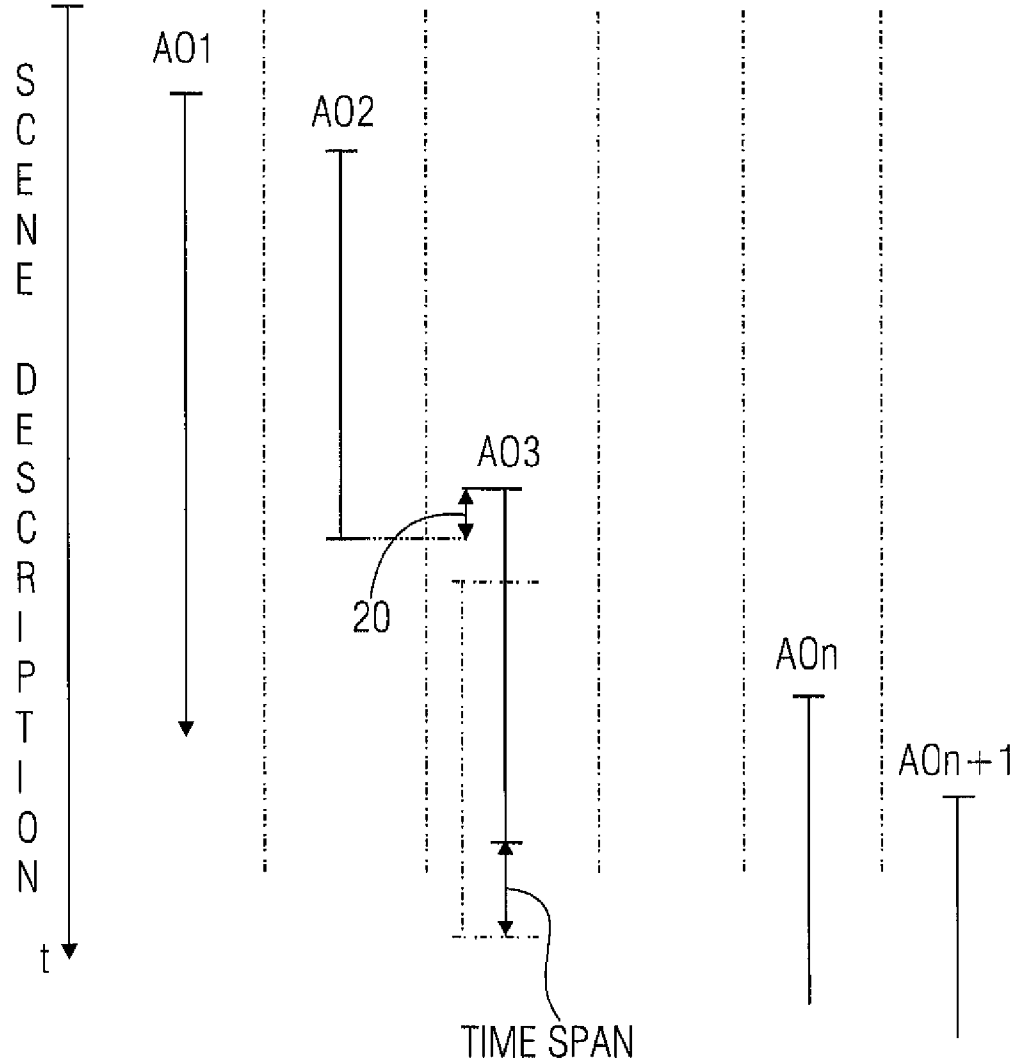
FIG. 2 shows an exemplary audio object.
FIG. 3 shows an exemplary scene description.

According to the invention, a relative definition of the audio objects with respect to each other, and particularly a positioning variable within a time span or location span, is advantageous for the especially favorable definition of the output conditions, as it will still be described on the basis of FIG. 3.

Thus, the relative positioning or arrangement of audio objects/audio files either with or without the use of a database provides a practicable way to define output conditions, which advantageously have a property of two virtual objects with respect to each other, i.e. also something relative to the object. Advantageously, however, also a database is employed, in order to be able to reuse such associations/output conditions.

Furthermore, by a relative association of audio objects among each other, greater flexibility as to the scene handling is achieved. For example, the guitar is to be linked temporally with concurrently occurring steps. Shifting the guitar by 10 seconds into the future automatically would also shift the steps by 10 seconds into the future, without having to alter properties in the "step object".

According to the invention, both relative and variable constraints are used to check the violation of certain sound requirements on different systems. Thus, such an output condition is, for example, defined in that the sound triggered by two audio objects A and B at a time instant t0 may reach the listener with a maximum difference of e.g. t=15 ms. Then, the audio objects A and B are positioned in space. A checking mechanism then checks the present reproduction area given by the wave field synthesis loudspeaker array as to whether there are positions at which the output condition is violated. Advantageously, the author of the sound scene will also be informed of this violation.

Depending on the implementation, the inventive simulation apparatus may provide a mere indication of the situation of the output condition, i.e. whether it is violated or not, and possibly where it is violated and where not. Advantageously, the inventive simulation apparatus is, however, formed to not only identify the problematic virtual sources, but already propose solutions to an editor. At the example of the sound runtime references, a solution would for example consist in guitar and bass being positioned at such virtual positions only having a distance small enough so that the wave fronts actually arrive within the demanded difference fixed by the output condition everywhere in the reproduction room. The simulation means may here use an iterative approach, in which the sources are moved closer and closer toward each other at a certain step size, in order to then see if the output condition is now satisfied at previously still problematic points in the reproduction room. The "cost function" thus will be whether less output condition violation points than in the previous iteration pass are present.

To this end, the inventive apparatus includes a means for manipulating an audio object if the audio object violates the output condition. This manipulation may thus consist in an iterative manipulation, in order to make a positioning proposal for the user.

Alternatively, the inventive concept with this manipulation means may also be employed in the wave field synthesis rendering, in order to generate a schedule adapted to the actual system from a scene description. This implementation is advantageous especially when the audio objects are not fixedly given with respect to time and place, but a time span and/or location span with respect to time and location is given, in which the audio object manipulation means may manipulate the audio objects in self-acting manner without further asking the sound master. According to the invention, it is of course taken care, in such real-time simulation/rendering, that the output conditions are not violated even further by a shift within a time span or location span.

Alternatively, the inventive apparatus may also work offline by writing, by audio object manipulation from an audio scene description, a schedule file, which is based on the simulation results for various output conditions and which may then be rendered in a wave field synthesis system instead of the original audio scene description. It is an advantage in this implementation that the audio schedule file has been written without intervention of the sound master, i.e. without consumption of temporal and financial resources of a producer.

Subsequently, with reference to FIG. 2, it is pointed to information an audio object advantageously should have. Thus, an audio object is to specify the audio file that in a way represents the audio content of a virtual source. Thus, the audio object, however, does not have to include the audio file, but may have an index referring to a defined location in a database at which the actual audio file is stored.

Furthermore, an audio object may include an identification of the virtual source, which may for example be a source number or a meaningful file name, etc. Furthermore, in the present invention, the audio object specifies a time span for the beginning and/or the end of the virtual source, i.e. the audio file. If only a time span for the beginning is specified, this means that the actual starting point of the rendering of this file may be changed by the renderer within the time span. If additionally a time span for the end is given, this means that the end may also be varied within the time span, which will altogether lead to a variation of the audio file also with respect to its length, depending on the implementation. Any implementations are possible, such as also a definition of the start/end time of an audio file so that the starting point is indeed allowed to be shifted, but that the length must not be changed in any case, so that the end of the audio file thus is also shifted automatically. For noise, in particular, it is, however, advantageous to also keep the end variable, because it typically is not problematic whether e.g. a sound of wind will start a little sooner or later or end a little sooner or later. Further specifications are possible and/or desired depending on the implementation, such as a specification that the starting point is indeed allowed to be varied, but not the end point, etc.

Advantageously, an audio object further includes a location span for the position. Thus, for certain audio objects, it will not be important whether they come from e.g. front left or front center or are shifted by a (small) angle with respect to a reference point in the reproduction room. However, there are also audio objects, particularly again from the noise region, as it has been explained, which can be positioned at any arbitrary location and thus have a maximum location span, which may for example be specified by a code for "arbitrary" or by no code (implicitly) in the audio object.

An audio object may include further information, such as an indication of the type of virtual source, i.e. whether the virtual source has to be a point source for sound waves or has to be a source for plane waves or has to be a source producing sources of arbitrary wave front, as far as the renderer modules are capable of processing such information.

FIG. 3 exemplarily shows a schematic illustration of a scene description in which the temporal sequence of various audio objects AO1, . . . , AOn+1 is illustrated. In particular, it is pointed to the audio object AO3, for which a time span is defined, as drawn in FIG. 3. Thus, both the starting point and the end point of the audio object AO3 in FIG. 3 can be shifted by the time span. The definition of the audio object AO3, however, is that the length must not be changed, which is, however, variably adjustable from audio object to audio object.

Thus, it can be seen that by shifting the audio object AO3 in positive temporal direction, a situation may be reached in which the audio object AO3 does not begin until after the audio object AO2. If both audio objects are played on the same renderer, a short overlap 20, which might otherwise occur, can be avoided by this measure. If the audio object AO3 already were the audio object lying above the capacity of the known renderer, due to already all further audio objects to be processed on the renderer, such as audio objects AO2 and AO1, complete suppression of the audio object AO3 would occur without the present invention, although the time span 20 was only very small. According to the invention, the audio object AO3 is shifted by the audio object manipulation means 3 so that no capacity excess and thus also no suppression of the audio object AO3 takes place any more.

In the embodiment of the present invention, a scene description having relative indications is used. Thus, the flexibility is increased by the beginning of the audio object AO2 no longer being given in an absolute point in time, but in a relative period of time with respect to the audio object AO1. Correspondingly, a relative description of the location indications is advantageous, i.e. not the fact that an audio object is to be arranged at a certain position xy in the reproduction room, but is e.g. offset to another audio object or to a reference object by a vector.

Thereby, the time span information and/or location span information may be accommodated very efficiently, namely simply by the time span being fixed so that it expresses that the audio object AO3 may begin in a period of time between two minutes and two minutes and twenty seconds after the start of the audio object AO1.

Such a relative definition of the space and time conditions leads to a database-efficient representation in form of constraints, as it is described e.g. in "Modeling Output Constraints in Multimedia Database Systems", T. Heimrich, 1th International Multimedia Modelling Conference, IEEE, Jan. 2, 2005 to Jan. 14, 2005, Melbourne. Here, the use of constraints in database systems is illustrated, to define consistent database states. In particular, temporal constraints are described using Allen relations, and spatial constraints using spatial relations. Herefrom, favorable output constraints can be defined for synchronization purposes. Such output constraints include a temporal or spatial condition between the objects, a reaction in case of a violation of a constraint, and a checking time, i.e. when such a constraint must be checked.

In the embodiment of the present invention, the spatial/temporal output objects of each scene are modeled relatively to each other. The audio object manipulation means achieves translation of these relative and variable definitions into an absolute spatial and temporal order. This order represents the output schedule obtained at the output 6*a* of the system shown in FIGS. 1A-1D and defining how particularly the renderer module in the wave field synthesis system is addressed. The schedule thus is an output plan arranged in the audio data corresponding to the output conditions.

Figure 4:
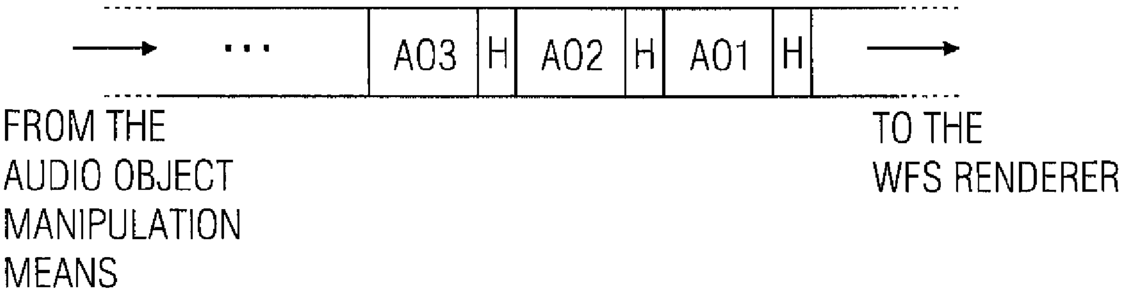
FIG. 4 shows a bit stream, in which a header having the current time data and position data is associated with each audio object.

Subsequently, on the basis of FIG. 4, an embodiment of such an output schedule will be set forth. In particular, FIG. 4 shows a data stream, which is transmitted from left to right according to FIG. 4, i.e. from the audio object manipulation means to one or more wave field synthesis renderers of a wave field system. In particular, the data stream includes, for each audio object in the embodiment shown in FIG. 4, at first a header H, in which the position information and the time information are, and a downstream audio file for the special audio object, which is designated with AO1 for the first audio object, AO2 for the second audio object, etc. in FIG. 4.

A wave field synthesis renderer then obtains the data stream and recognizes, e.g. from present and fixedly agreed-upon synchronization information, that now a header comes. On the basis of further synchronization information, the renderer then recognizes that the header now is over. Alternatively, also a fixed length in bits can be agreed for each header.

Following the reception of the header, the audio renderer in the embodiment of the present invention shown in FIG. 4 automatically knows that the subsequent audio file, i.e. e.g. AO1, belongs to the audio object, i.e. to the source position identified in the header.

FIG. 4 shows serial data transmission to a wave field synthesis renderer. Of course, several audio objects are played in a renderer at the same time. For this reason, the renderer necessitates an input buffer preceded by a data stream reading means to parse the data stream. The data stream reading means will then interpret the header and store the accompanying audio files correspondingly, so that the renderer then reads out the correct audio file and the correct source position from the input buffer, when it is an audio object's turn to render. Other data for the data stream is of course possible. Separate transmission of both the time/location information and of the actual audio data may also be used. The combined transmission illustrated in FIG. 4 is advantageous, however, since it eliminates data consistency problems by concatenation of the position/time information with the audio file, since it is ensured that the renderer also has the right source position for audio data and is not still rendering e.g. audio files of an earlier source, but is already using position information of the new source for rendering.

The present invention thus is based on an object-oriented approach, i.e. that the individual virtual sources are understood as objects characterized by an audio object and a virtual position in space and maybe by the type of source, i.e. whether it is to be a point source for sound waves or a source for plane waves or a source for sources of other shape.

As it has been set forth, the calculation of the wave fields is very computation-time intensive and bound to the capacities of the hardware used, such as soundcards and computers, in connection with the efficiency of the computation algorithms. Even the best-equipped PC-based solution thus quickly reaches its limits in the calculation of the wave field synthesis, when many demanding sound events are to be represented at the same time. Thus, the capacity limit of the software and hardware used gives the limitation with respect to the number of virtual sources in mixing and reproduction.

Figure 6:
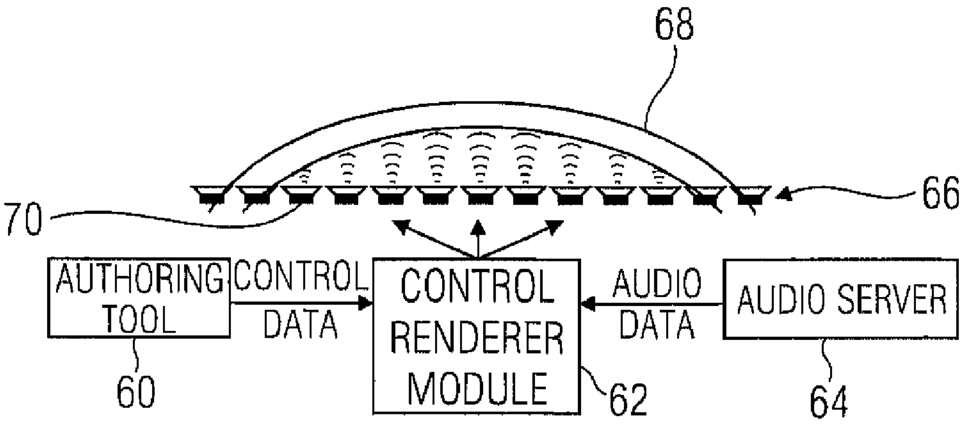
FIGURE 6 (PRIOR ART)
FIG. 6 is a schematic illustration of a known wave field synthesis concept.
Figure 7:
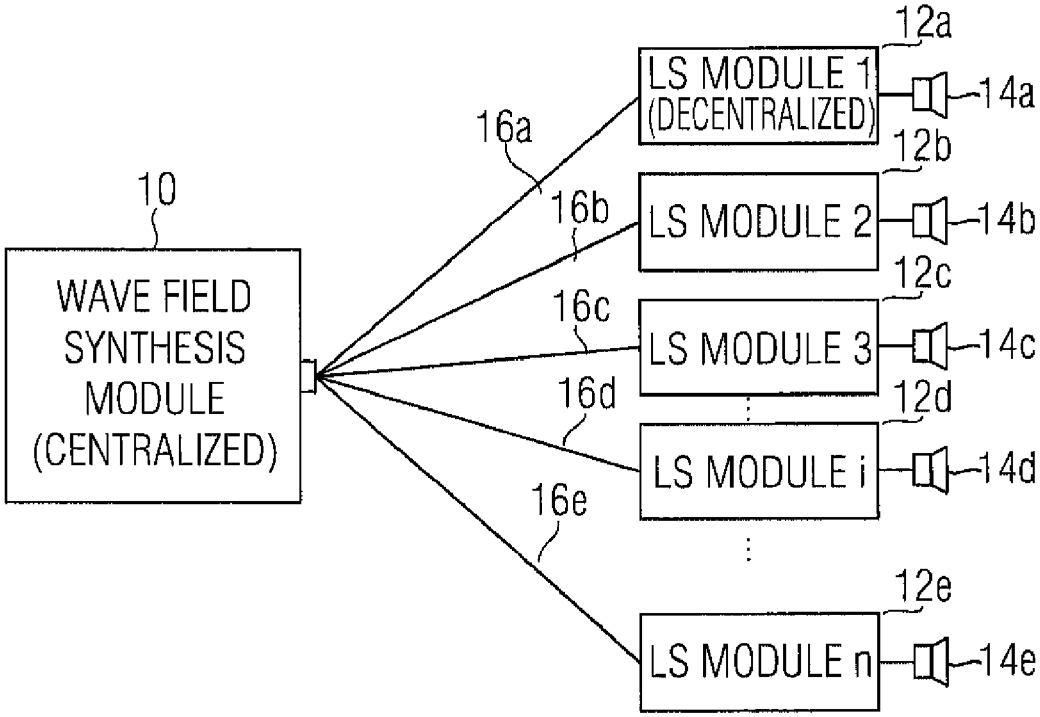
FIGURE 7 (PRIOR ART)
FIG. 7 is a further illustration of a known wave field synthesis concept.

FIG. 6 shows such a known wave field synthesis concept limited in its capacity, which includes an authoring tool 60, a control renderer module 62, and an audio server 64, wherein the control renderer module is formed to provide a loudspeaker array 66 with data, so that the loudspeaker array 66 generates a desired wave front 68 by superposition of the individual waves of the individual loudspeakers 70. The authoring tool 60 enables the user to create and edit scenes and control the wave-field-synthesis-based system. A scene thus consists of both information on the individual virtual audio sources and of the audio data. The properties of the audio sources and the references to the audio data are stored in an XML scene file. The audio data itself is filed on the audio server 64 and transmitted to the renderer module therefrom. At the same time, the renderer module obtains the control data from the authoring tool, so that the control renderer module 62, which is embodied in centralized manner, may generate the synthesis signals for the individual loudspeakers. The concept shown in FIG. 6 is described in "Authoring System for Wave Field Synthesis", F. Melchior, T. Röder, S. Brix, S. Wabnik and C. Riegel, AES Convention Paper, 115th AES convention, Oct. 10, 2003, New York.

If this wave field synthesis system is operated with several renderer modules, each renderer is supplied with the same audio data, no matter if the renderer needs this data for the reproduction due to the limited number of loudspeakers associated with the same or not. Since each of the current computers is capable of calculating 32 audio sources, this represents the limit for the system. On the other hand, the number of the sources that can be rendered in the overall system is to be increased significantly in efficient manner. This is one of the substantial prerequisites for complex applications, such as movies, scenes with immersive atmospheres, such as rain or applause, or other complex audio scenes.

According to the invention, a reduction of redundant data transmission processes and data processing processes is achieved in a wave field synthesis multi-renderer system, which leads to an increase in computation capacity and/or the number of audio sources computable at the same time.

For the reduction of the redundant transmission and processing of audio and meta data to the individual renderer of the multi-renderer system, the audio server is extended by the data output means, which is capable of determining which renderer needs which audio and meta data. The data output means, maybe assisted by the data manager, needs several pieces of information, in an embodiment. This information at first is the audio data, then time and position data of the sources, and finally the configuration of the renderers, i.e. information about the connected loudspeakers and their positions, as well as their capacity. With the aid of data management techniques and the definition of output conditions, an output schedule is produced by the data output means with a temporal and spatial arrangement of the audio objects. From the spatial arrangement, the temporal schedule and the renderer configuration, the data management module then calculates which sources are relevant for which renderers at a certain time instant.

Figure 5:
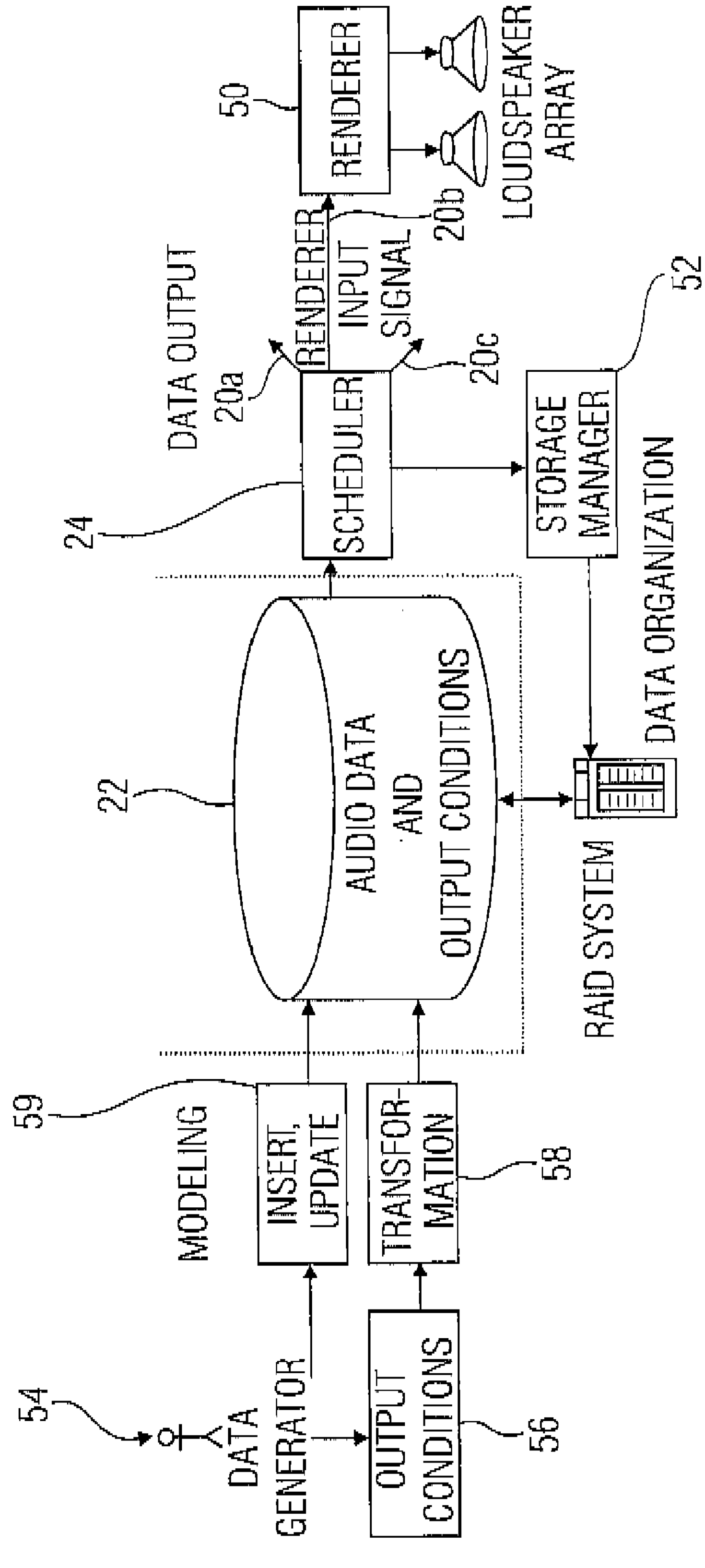
FIG. 5 shows an embedding of the inventive concept into an overall wave field synthesis system.

An advantageous overall concept is illustrated in FIG. 5. The database 22 is supplemented by the data output means 24 on the output side, wherein the data output means is also referred to as scheduler. This scheduler then generates the renderer input signals for the various renderers 50 at its outputs 20*a*, 20*b*, 20*c*, so that the corresponding loudspeakers of the loudspeaker arrays are supplied.

Advantageously, the scheduler 24 also is assisted by a storage manager 52, in order to configure the database 42 by means of a RAID system and corresponding data organization defaults.

On the input side, there is a data generator 54, which may for example be a sound master or an audio engineer who is to model or describe an audio scene in object-oriented manner. Here, it gives a scene description including corresponding output conditions 56, which are then stored together with audio data in the database 22 after a transformation 58, if necessary. The audio data may be manipulated and updated by means of an insert/update tool 59.

Depending on the conditions, the inventive method may be implemented in hardware. The implementation may be on a digital storage medium, particularly a floppy disk or CD, with electronically readable control signals capable of cooperating with a programmable computer system so that the method is executed. In general, the invention thus also consists in a computer program product with program code stored on a machine-readable carrier for performing the method, when the computer program product is executed on a computer. In other words, the invention may thus also be realized as a computer program with program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A hardware apparatus for simulating a wave field synthesis system with respect to the reproduction room, in which one or more loudspeaker arrays, which can be coupled to a wave field synthesis renderer, are attachable, comprising:

a provider for providing an audio scene description defining a temporal sequence of audio objects, wherein an audio object comprises an audio file for a virtual source or a reference to the audio file and information on a source position of the virtual source, and wherein an output condition is given for the wave field synthesis system;

a simulator for simulating the behavior of the wave field synthesis system, using information on the wave field synthesis system and the audio files;

a checker for checking if the simulated behavior satisfies the output condition; and an identifier for identifying which condition, out of a plurality of output conditions, is not satisfied, and due to which virtual source, out of a plurality of virtual sources, the output condition is not satisfied.

2. The hardware apparatus according to claim 1, wherein the output condition defines a behavior of a sound field in the reproduction room, wherein the simulator is formed to simulate the sound field in the reproduction room, and wherein the checker is formed to check if the simulated sound field satisfies the output condition in the reproduction room.

3. The hardware apparatus according to claim 1, wherein the simulator comprises:

a wave field synthesis renderer formed to generate synthesis signals from the audio scene description and from information on positions of the loudspeakers in the reproduction room; and a loudspeaker simulator for simulating the sound field generated by the loudspeakers, on the basis of the synthesis signals.

4. The hardware apparatus according to claim 1, wherein the provider is formed to provide an output condition comprising a defined property of a first virtual source with respect to a second virtual source, wherein the simulator is formed to simulate a first sound field in the reproduction room due to the first virtual source without the second virtual source and also a second sound field in the reproduction room due to the second virtual source without the first virtual source, and wherein the checker is formed to check the defined property on the basis of the first sound field and the second sound field.

5. The hardware apparatus according to claim 1, wherein the simulator is formed to simulate the sound field for various positions in the reproduction room, and wherein the checker is formed to check the output condition for the various positions.

6. The hardware apparatus according to claim 1, further comprising:

an indicator for indicating whether and where the output condition is satisfied or not satisfied in the wave field synthesis system.

7. The hardware apparatus according to claim 1, wherein the output condition prescribes that a wave front due to a first virtual source and a wave front due to a second virtual source in the reproduction room must arrive within a predetermined time duration at a point in the reproduction room, wherein the simulator is formed to calculate a time difference of the impingement of the wave front due to the first virtual source and the impingement of the wave front due to the second virtual source; and wherein the checker is formed to compare the calculated time difference with the output condition.

8. The hardware apparatus according to claim 1, further comprising:

a manipulator for manipulating an audio object if the audio object violates the output condition.

9. The hardware apparatus according to claim 8, wherein manipulator is formed to manipulate a virtual position of the audio object, a starting time instant or an end time instant, or mark the audio object in the audio scene as problematic, such that the audio object can be suppressed in the reproduction of the audio scene.

10. The hardware apparatus according to claim 1, wherein the output condition defines a loudness difference between two virtual sources, wherein the simulator is formed to determine a loudness difference of the two virtual sources at a location in the reproduction room, and wherein the checker is formed to compare the determined loudness difference with the output condition.

11. The hardware apparatus according to claim 1, wherein the output condition is a maximum number of audio objects to be processed by a wave field synthesis renderer at the same time, wherein the simulator is formed to determine a utilization of the wave field synthesis renderer, and wherein the checker is formed to compare a calculated utilization with the output condition.

12. The hardware apparatus according to claim 1, wherein an audio object in the audio scene description defines a temporal start or a temporal end for an associated virtual source, wherein the audio object of the virtual source comprises a time span in which the start or the end must be, or comprises a location span in which a position of the virtual source must be.

13. The hardware apparatus according to claim 12, further comprising:

an audio object manipulator for varying an actual starting point or end point of an audio object within the time span or an actual position of the virtual source within the location span in response to a violation of the output condition.

14. The hardware apparatus according to claim 13, further formed to examine if a violation of an output condition can be remedied by the variation of the audio object within the time span or location span.

15. A method of simulating a wave field synthesis system with respect to a reproduction room, in which one or more loudspeaker arrays, which can be coupled to a wave field synthesis renderer, are attachable, comprising:

providing, by a provider, an audio scene description defining a temporal sequence of audio objects, wherein an audio object comprises an audio file for a virtual source or a reference to the audio file and information on a source position of the virtual source, and wherein an output condition is given for the wave field synthesis system;

simulating, by a simulator, the behavior of the wave field synthesis system, using information on the wave field synthesis system and the audio files;

checking, by a checker, if the simulated behavior satisfies the output condition; and identifying which condition, out of a plurality of output conditions, is not satisfied, and due to which virtual source, out of a plurality of virtual sources, the output condition is not satisfied; wherein the method is performed by a computer.

16. A tangible digital storage medium having stored thereon a computer program with program code for performing, when the program is executed on a computer, a method of simulating a wave field synthesis system with respect to a reproduction room, in which one or more loudspeaker arrays, which can be coupled to a wave field synthesis renderer, are attachable, the method comprising:

providing an audio scene description defining a temporal sequence of audio objects, wherein an audio object comprises an audio file for a virtual source or a reference to the audio file and information on a source position of the virtual source, and wherein an output condition is given for the wave field synthesis system;

simulating the behavior of the wave field synthesis system, using information on the wave field synthesis system and the audio files;

checking if the simulated behavior satisfies the output condition; and identifying which condition, out of a plurality of output conditions, is not satisfied, and due to which virtual source, out of a plurality of virtual sources, the output condition is not satisfied.

* * * * *